United States Patent
Tame

(10) Patent No.: US 6,793,285 B1
(45) Date of Patent: Sep. 21, 2004

(54) SAFETY MECHANISM FOR A FOLD AND TUMBLE SEAT ASSEMBLY

(75) Inventor: Omar D. Tame, Bloomfield, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/936,497

(22) PCT Filed: Mar. 13, 2000

(86) PCT No.: PCT/CA00/00264

§ 371 (c)(1),
(2), (4) Date: Jan. 4, 2002

(87) PCT Pub. No.: WO00/55003

PCT Pub. Date: Sep. 21, 2000

Related U.S. Application Data
(60) Provisional application No. 60/124,082, filed on Mar. 13, 2000.

(51) Int. Cl.$^7$ .................................................. B60N 2/30
(52) U.S. Cl. ............. 297/336; 297/378.12; 297/378.13; 296/65.01; 296/65.05; 296/65.09
(58) Field of Search ............................ 297/336, 378.12, 297/378.13, 378.1; 296/65.01, 68.01, 65.05, 65.09, 69

(56) References Cited

U.S. PATENT DOCUMENTS

| | | | |
|---|---|---|---|
| 4,484,776 A | * 11/1984 | Gokimoto et al. ...... 297/378.13 |
| 4,627,656 A | * 12/1986 | Gokimoto et al. ...... 297/378.13 |
| 4,636,003 A | * 1/1987 | Siebler ................... 297/378.13 |
| 4,700,989 A | 10/1987 | Ercilla ................ 297/378.13 X |
| 4,781,354 A | 11/1988 | Nihei et al. .......... 297/378.12 X |
| 5,248,178 A | 9/1993 | Brambilla ........... 297/378.12 X |
| 5,282,662 A | * 2/1994 | Bolsworth et al. .. 297/378.12 X |
| 5,368,355 A | 11/1994 | Hayden et al. ...... 297/378.12 X |
| 5,393,116 A | 2/1995 | Bolsworth et al. .. 297/378.12 X |
| 5,454,624 A | 10/1995 | Anglade et al. .... 297/378.12 X |
| 5,577,805 A | 11/1996 | Glinter et al. .......... 297/378.12 |
| 5,626,392 A | 5/1997 | Bauer et al. ......... 297/378.12 X |
| 5,700,055 A | * 12/1997 | Davidson et al. ....... 297/378.12 |
| 5,707,103 A | 1/1998 | Balk ................... 297/378.12 X |
| 5,765,894 A | * 6/1998 | Okazaki et al. ...... 297/378.13 X |
| 5,775,763 A | 7/1998 | Glinter et al. ....... 297/378.12 X |
| 6,024,411 A | * 2/2000 | Pesta et al. .......... 297/378.12 X |
| 6,135,555 A | * 10/2000 | Liu et al. ............. 297/378.12 X |
| 6,345,867 B1 | * 2/2002 | Hellrung et al. ............. 297/336 |
| 6,523,899 B1 | * 2/2003 | Tame ..................... 297/336 X |

FOREIGN PATENT DOCUMENTS

| | | |
|---|---|---|
| EP | 0 780 259 B1 | 11/1999 |
| FR | 2 770 811 A1 | 11/1997 |
| WO | WO 96/20848 | 7/1996 |

* cited by examiner

Primary Examiner—Rodney B. White
(74) Attorney, Agent, or Firm—Clark Hill PLC

(57) ABSTRACT

A seat assembly (14) for use in an automotive vehicle and pivotal between a seating position and a fold and tumbled position. The seat assembly (14) includes a seat cushion (18) and a seat back (20) pivotally connected to the seat cushion for pivotal movement between an upright seating position and a folded position. The seat assembly includes a locking latch (46) supported by the seat cushion and pivotal between a latched position for releasably latching the seat assembly (14) to the floor (16) of the vehicle and an unlatched position for releasing the seat assembly to allow the seat assembly to pivot from the seating position to the tumbled position. The seat assembly further includes a blocking member (70) coupled between the seat back (20) and the locking latch (46) and operable in a first blocking position for engaging the seat back and preventing the locking latch from releasing from releasing from the latched position when the seat back is in the upright seating position. The blocking member (70) is also operable in a second blocking position for engaging the seat back in the folded position when the locking latch is in the unlatched position to prevent pivotal movement of the seat from the folded position to the upright seating position until the locking latch is returned to the latched position securing the seat assembly in the seating position.

11 Claims, 5 Drawing Sheets

SAFETY MECHANISM FOR A FOLD AND TUMBLE SEAT ASSEMBLY

This application claims the benefit of application Ser. No. 60/124,082 filed Mar. 13, 2000.

BACKGROUND OF THE INVENTION

1. Field of the Invention

The present invention relates generally to a fold and tumble seat assembly, and more particularly, to a safety mechanism for controlling the folding and tumbling of a seat back and seat cushion of the seat assembly.

2. Description of the Prior Art

Seat assemblies for automotive vehicles typically include a generally horizontal seat cushion and generally upright seat back for supporting a seat occupant in an upright seating position. The seat cushion is commonly mounted to a planar floor within the vehicle by front and rear seat cushion risers and the seat back is commonly pivotally attached to a seat cushion for pivotal movement between the upright seating position to a forward folded position resting against the generally horizontal sea cushion. The forward folding movement of the seat back accommodates increase storage capacity in automotive vehicles, such as sport utility vehicle, mini-vans, and the like. The seat assembly may also be pivotal about the front seat cushion risers from the seating position to a forward tumble position wherein the seat back is pivoted to the folded position and then the seat cushion and seat back are pivoted about the front seat cushion riser to an upright tumble position. These type of seat assemblies, commonly referred to as fold and tumble seat assemblies, are exemplified in U.S. Pat. No. 5,393,116 to Bolsworth et al., issued Feb. 28, 1995 and U.S. Pat. No. 5,775,763 to Glinter et al., issued Jul. 7, 1998.

Preferably, the seat back is pivoted to the folded position prior to the seat cushion and seat back being pivoted to the tumbled position. Additionally, the seat back is preferably pivoted from the folded position to the upright seating position after the seat cushion has been fully pivoted and returned from the tumbled position to the seating position.

It remains desirable, however, to provide a safety mechanism to ensure and insist that the seat assembly may not be pivoted from the seating position to the tumble position until the seat back has been pivoted to the folded position. It also remains desirable to provide a safety mechanism to ensure and insist that the seat assembly is fully returned to from the tumble position the seating position and secured to the vehicle floor prior to the seat back being pivoted from the folded position to the upright seating position for seat occupant use.

Attempts have been made to provide such safety mechanisms. For example, European Patent 780259 discloses a seat assembly having a frame with a seat cushion, seat back and support foot. The seat back is able to pivot relative to the seat cushion between an upright position and a forwardly folded position. The support foot has a ball lock for releaseably fastening it to the floor of the vehicle. The seat back and seat cushion are interconnected by a mobile mechanism which allows the relative position to be remotely adjusted. A catch locks the seat back in position were the seat cannot be occupied. The mechanism incorporates a pivot pin which slides in a guide fixed to the seat frame. The catch has a hook which can be moved between locked and released positions to move the pin and lock the catch prevent seat back movement.

Another example is shown in PCT application PCT/GB95/03046, published Jul. 11, 1996. The PCT application discloses a locking mechanism for a folding vehicle seat which ensures that the seat cannot be unfolded to a position suitable for use as a seat unless it is correctly engaged with latching points on the vehicle floor. The mechanism provides an actuating control including a blocking member and a lever for moving the blocking member into and out of engagement with the seat back to facilitate movement of the seat back from a folded position to an upright position once the seat is correctly engaged with the latching points. The lever of the actuating control is manipulated by a separate mechanism associated with the latching points.

SUMMARY OF THE INVENTION

The present invention includes a seat assembly for use in an automotive vehicle comprising a seat cushion for supporting a seat occupant on the seat assembly and a seat back operatively coupled to the seat cushion for pivotal movement between a generally upright seating position and a forwardly folded position pivoted against the seat cushion. The seat assembly includes a front seat riser adapted to secure the seat assembly to the vehicle. The front seat riser is pivotally coupled to the seat cushion for pivoting the seat cushion between a generally horizontal seating position and a generally upright tumbled position. The seat assembly also includes a rear seat riser adapted to releasably secure the seat assembly to the vehicle. The rear seat riser includes a locking latch operable between a latched position for releasably latching the rear seat riser to the vehicle with the seat cushion in the seating position and an unlatched position for releasing the rear seat riser from the vehicle to allow the seat cushion to pivot from the seating position to the tumble position. The seat assembly further includes a seat back pivot mechanism coupled to the seat back and operable between a locked position, locking the seat back in the upright seating position, and an unlocked position, providing pivotal movement of the seat back between the upright seating position and the folded position. The seat assembly additionally includes a blocking member coupled between the seat back and the locking latch and operable in a first blocking position for engaging the seat back in the upright seating position and preventing the locking latch from releasing from the latched position to the unlatched position when the seat back is locked by the seat back pivot mechanism in the upright seating position.

The blocking member is also operable in a second blocking position for engaging the seat back in the folded position when the locking latch is in the unlatched position and preventing pivotal movement of the seat back from the folded position to the seating position until the locking latch is returned to the latched position latching the rear seat riser to the vehicle with the seat cushion in the seating position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
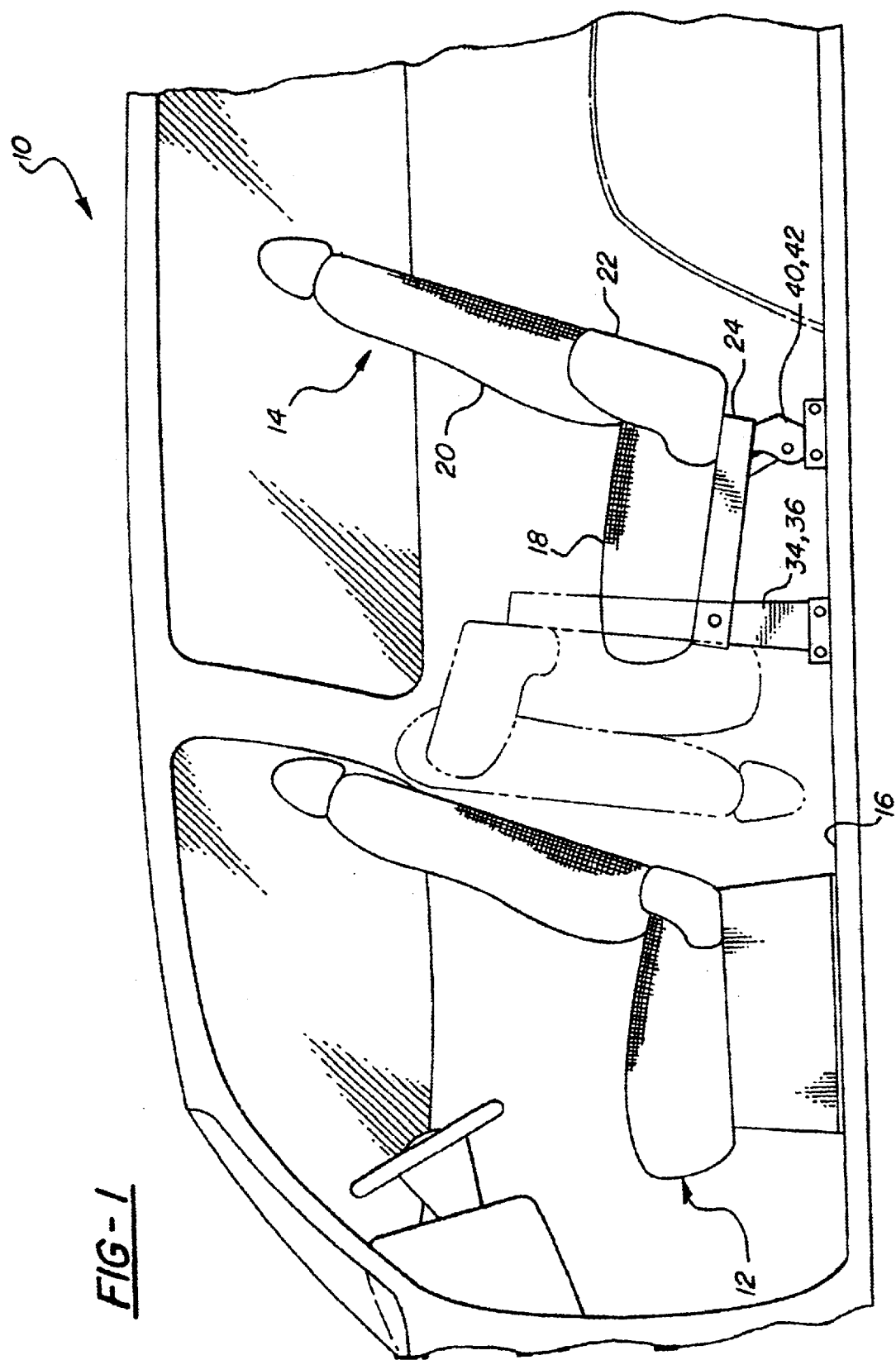
FIG. 1 is an environmental view of a seat assembly shown pivotal between an upright seat position and a folded and tumble position.

Referring to the FIGS wherein like reference number correspond to like part throughout the several views, an automotive vehicle is generally shown at 10 in FIG. 1. The vehicle 10 includes at least one front, or first row, seat assembly 12 and at least one rear, or second row, seat assembly 14. It should be appreciated that the front row typically includes a driver side seat assembly, as shown at 12 and a passenger side seat assembly (not shown). Additionally, the second row may include more than the one seat assembly 14 aligned in a row between the inboard and outboard side of the vehicle 10 as is commonly known in the art. Still further, the vehicle 10 may also include a third row of one or more seat assemblies similar to the seat assembly 14. The seat assembly 14 only will be described herein for illustrative purposes. The seat assembly 14 of FIG. 1 is shown in a generally horizontal and upright seating position in solid lines for supporting a seat occupant and is shown in a fold and tumble position in dashed lines for providing additional cargo space within the vehicle 10. The seat assembly 14 is releasably and pivotally secured to a planar floor 16 within the vehicle 10 as will be described in further detail hereinbelow.

The seat assembly 14 includes a seat cushion 18 for supporting the seat occupant on the seat assembly 14 and a seat back 20 operatively coupled to the seat cushion 18 and pivotal between a generally upright seating position, as shown in solid lines, and a forwardly folded position pivoted against said seat cushion, as shown in dashed lines. The seat assembly 14 also includes a seat back pivot mechanism 22 coupled to the seat back 20 and operable between a locked position locking the seat back 20 in the upright seating position and an unlocked position for providing pivotal movement of the seat back 20 between the upright seating position and the folded position. The seat back pivot mechanism 22 is any mechanism suitable for pivoting the seat back 20 between the upright seating position and the folded position as is commonly known in the art.

Figure 2:
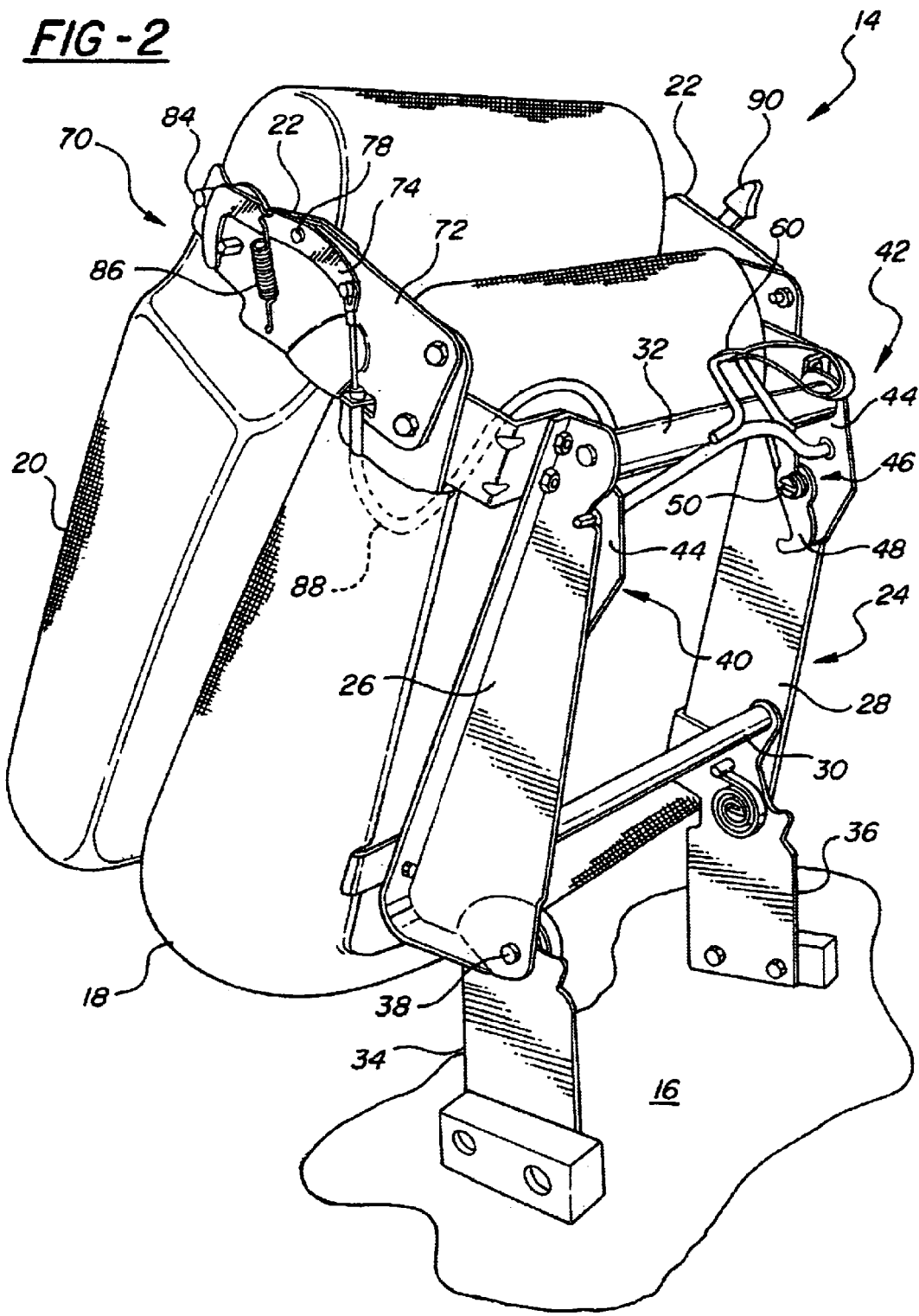
FIG. 2 is a perspective view of the seat assembly with a seat back in a folded position and a seat cushion in a tumbled position.

Referring to FIGS. 1 and 2, the seat assembly 14 includes a support frame 24 for supporting the seat cushion 18 above the vehicle floor 16. The support frame 24 includes a pair of spaced apart and parallel side rails 26, 28 interconnected by a pair of spaced apart front and rear cross bars 30, 32. The seat assembly 14 further includes a pair of spaced apart front seat risers 34, 36 adapted to secure the seat assembly 14 to the vehicle floor 16. Each front seat riser 34, 36 includes a first end fixedly secured to the floor 16 by bolts or the like and a second end extending upwardly from the floor 16 and pivotally attached to the side rails 26, 28 of the support frame 24 by a pivot pin 38. The seat assembly 14 is pivotal about the front seat risers 34, 36 between the seating position and the folded and tumbled position. More specifically, the seat cushion 18 is pivotal about the front seat risers 34, 36 between a generally horizontal seating position, shown in solid lines in FIG. 1, and a forward tumbled position, as shown in dashed lines in FIG. 1. Coincidentally, the seat back 20 moves with the seat cushion 18 between the seating and tumbled positions. A seat cushion spring bias member, such as a torsion spring or coil spring 39 as shown, is interconnected between the seat cushion 18 and each front seat riser 34, 36 for biasing the seat cushion 18 from the seating position to the tumbled position. More specifically, the coil spring 39 is connected between each of the front seat risers 34, 36 and the pivot pin 38.

The seat assembly 14 further includes a pair of spaced apart rear seat risers 40, 42 adapted to releasably secure the seat assembly 14 to the vehicle floor 16. The front seat risers 34, 36 and rear seat risers 40, 42 elevated the seat assembly 14 above the vehicle floor 16.

Figure 3:
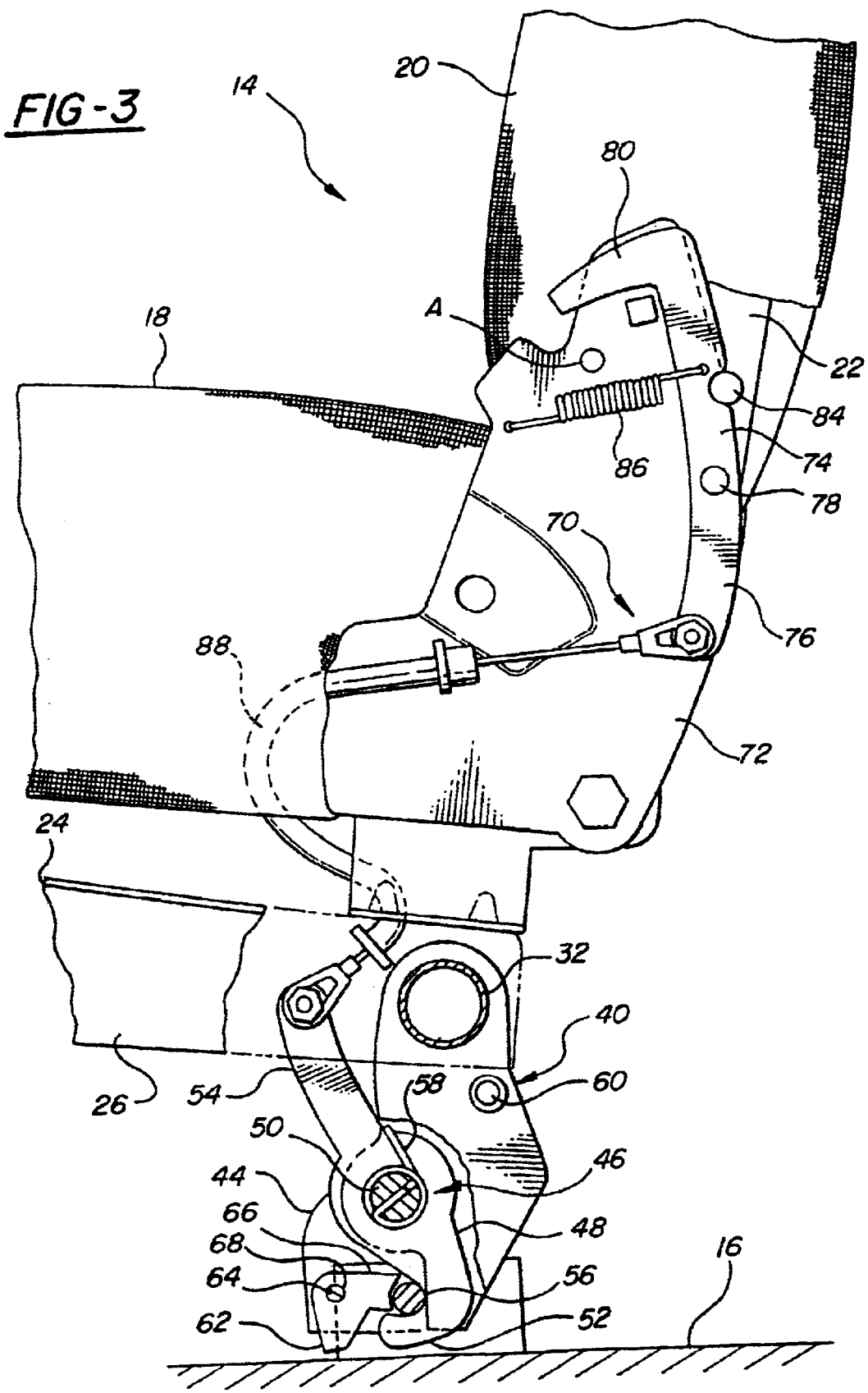
FIG. 3 is a side view of the seat assembly having a locking latch in a latched position and a blocking member engaging the seat back in a first blocking position.
Figure 4:
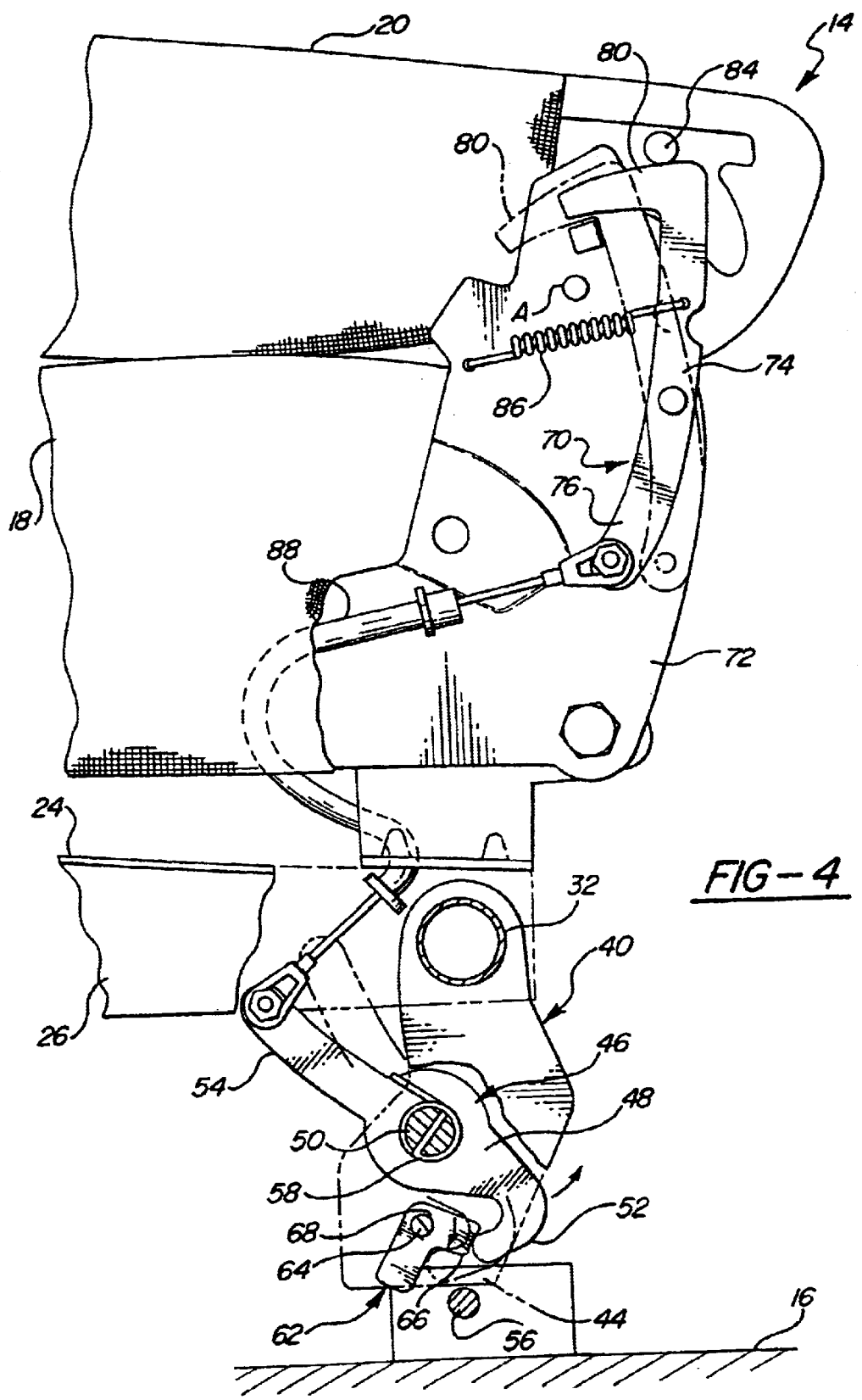
FIG. 4 is a side view of the seat assembly having the locking latch in an unlatched position and the blocking member engaging the seat back in a second blocking position.

Referring to FIGS. 2–4, each of the rear seat risers 40, 42 include a support bracket 44 pivotally secured to the respective side rail 26, 28 by the rear cross bar 32. Each rear seat riser 40, 42 further includes a locking latch 46 operable between a latched position for releasably latching the rear seat risers 40, 42 to the vehicle floor 16 with said seat cushion 18 in the seating position, as shown in FIG. 3, and an unlatched position for releasing the rear seat risers 40, 42 from the vehicle floor 16 to allow the seat cushion 18 to pivot from the seating position to the tumbled position.

Figure 5:
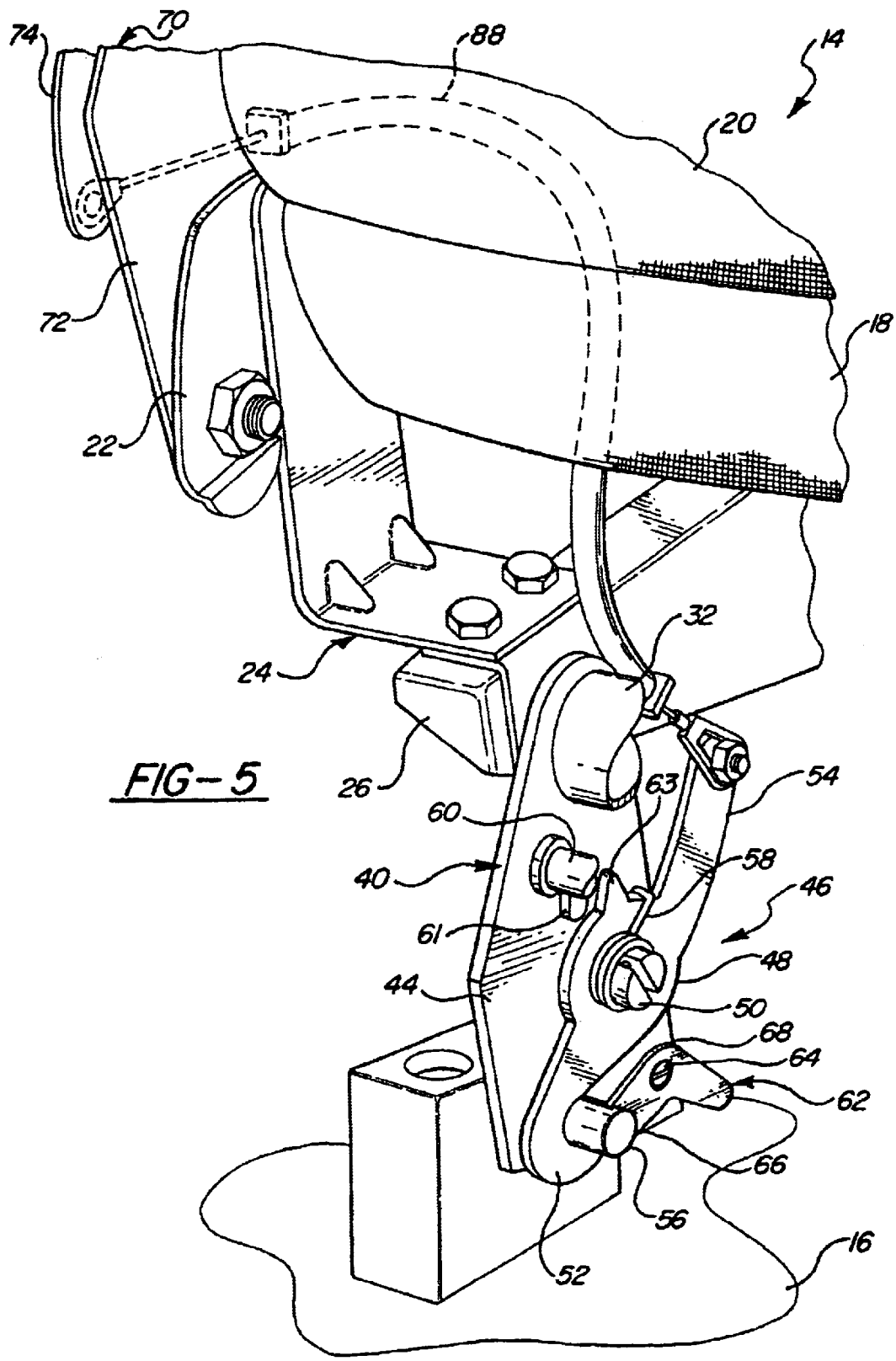
FIG. 5 is a partially broken perspective view of the seat assembly having the locking latch in the latched position.

Referring to FIGS. 2–5, the locking latch 46 includes a latch plate 48 pivotally coupled to the support bracket 44 of the rear seat riser 40, 42 by a pivot rod 50 for providing pivotal movement of the latch plate 48 between the latched position and the unlatched position. The latch plate 48 includes a C-shaped hook portion 52 and an extension portion 54 along opposing sides of the pivot rod 50. The hook portion 52 engages with a striker bar 56 mounted to the vehicle floor 16 as shown in FIGS. 3 and 5 in the latched position to retain the seat cushion 18 in the horizontal seating position. The locking latch 48 also includes a latch spring 58, such as a coil spring, having a first end connected to the latch plate 48 and a second end connected to the pivot rod 50 for biasing the latch plate 48 from the unlatched position to the latched position engaged with the striker bar 56. The locking latch 46 additionally includes a release handle 60 pivotally secured between the rear seat risers 40, 42 and engagable with the latch plate 48 for pivoting the latch plate 48 from the latched position to the unlatched position. The release handle 60 is an elongated rod extending between and pivotally coupled at each opposing end to the support bracket 44 of the rear seat risers 40,42. The opposing ends of the release handle 60 include a cam 61, which engages a cam lobe 63 extending outwardly from the latch plate 48 for pivoting the latch plate 48 about the pivot rod 50 from the latched position to the unlatched position when the release handle 60 is rotated in the clockwise direction. It should be appreciated that the release handle 60 may be directly connected to the latch plates 48 or the latch plates 48 may be bridged or interconnected for simultaneous movement by a release handle 60 engaging only one latch plate 48.

The locking latch 46 further includes a latch gate 62 pivotally connected to the support bracket 44 of the rear seat riser 40 for pivotal movement between an open position engaging and retaining the latch plate 48 in the unlatched position, as shown in FIG. 4 and a closed position disengaged from the latch plate 48 in the latched position, as shown in FIG. 3. The latch gate 62 is pivotally attached to the support bracket 44 by a pivot pin 64 and includes a gate finger 66 which engages the striker bar 56 in the closed position to capture the striker bar 56 between the latch gate 62 and the latch plate 48 and prevent rattle therebetween as shown in FIG. 3. The gate finger 66 also engages the hook portion 52 of the latch plate 48 in the open position to retain the latch plate 48 in the latched position as will be described in further detail hereinbelow. The locking latch 46 includes a gate spring 68, such as a coil spring, connected between the latch gate 62 and the pivot pin 64 for biasing the latch gate to the open position to engage the hook portion 52 of the latch plate 48 when in the unlatched position.

Referring again to FIGS. 3 and 4, the seat assembly 14 further includes a blocking member 70 coupled between the seat back 20 and the locking latch 46 and operable in a first blocking position for engaging the seat back 20 in the upright seating position and preventing the locking latch 46 from releasing from the latched position to the unlatched position when the seat back 20 is locked by the seat back pivot mechanism 22 in the upright seating position. The blocking member 70 is also operable in a second blocking position for engaging the seat back 20 in the folded position when the locking latch 46 is in the unlatched position and preventing pivotal movement of the seat back 20 from the folded position to the upright seating position until the locking latch 46 is returned to the latched position, latching the rear seat risers 40, 42 to the vehicle floor 16 with the seat cushion 18 in the seating position.

The blocking member 70 includes a support brace 72 fixedly secured to the support frame 24 of the seat cushion 18 and extending upwardly therefrom adjacent the lower portion of the seat back 20. The blocking arm 70 also includes a generally L-shaped blocking arm 74 pivotally connected to the support brace 72 for pivotal movement between the first blocking position and the second blocking position in response to the locking latch 46 operating between the latched position and the unlatched position. The blocking arm 74 includes a lower leg 76 pivotally connected to the support brace 72 by a pivot pin 78 and an upper arm 80 extending outwardly from the lower leg 76 adjacent the seat back 20. More specifically, the seat back 20 is pivotal about a pivot axis A defined by the seat back pivot mechanism 22. The seat back 20 includes an abutment nub 84 projecting laterally from the side of the seat back 20 adjacent the support brace 72 and spaced from the pivot axis A. The lower leg 76 engages the nub 84 when the seat back 20 is in the upright seating position as shown in FIG. 3. The upper arm 78 engages the nub 84 when the seat back 20 is in the folded position and the locking latch 46 is in the unlatched position. Still further, the blocking member 70 includes a spring bias member 86, such as an elongated wire coil spring, connected between the support brace 72 and the lower leg 76 of the blocking arm 74 for automatically returning the blocking arm 74 from the second blocking position to the first blocking position when the locking latch 46 returns from the unlatched position to the latched position.

A link 88, such as a pull-pull type cable, is interconnected between the extension portion 54 of the latch plate 48 and the lower leg 76 of the blocking arm 74 for pivoting the blocking arm 74 from the first blocking position to the second blocking position in response to the latch plate 48 pivoting from the latched position to the unlatched position.

In operation, the seat assembly 14 is operable between a seating position as shown in FIG. 1 for supporting a seat occupant on the seat and a folded and tumbled position as shown in FIG. 2 for providing additional cargo space in the vehicle 10. In the seat position, the seat back 20 is positioned in the generally upright seating position and the seat cushion is position in the generally horizontal seating position. In the folded and tumbled position, the seat back 20 is pivoted to the folded position and the seat cushion is pivoted to the tumbled position. When the seat back 20 is in the upright seating position as shown in FIG. 3, the blocking member 70 prevents the locking latch 46 from releasing from the latched position with the striker bar 56. The blocking member 70 prevents unlatching of the locking latch 46 so that the seat cushion is lockingly secured to the vehicle floor 16 to support a seat occupant and prevent incident pivotal movement of the seat assembly 14 from the seating position to the folded and tumble position More specifically, the nub 84 projecting outwardly from the seat back 20 is position immediately adjacent to the lower leg 76 of the blocking member 70 and above the pivot pin 78 when the seat back 20 is locked in the upright seating position by the seat back pivot mechanism 22. If the seat occupant attempts to actuate the locking latch 46 from the latched position to the unlatched position, the blocking arm 74 abuts the nub 84 in the first blocking position to prevent pivotal rotation of the blocking arm 74 about the pivot pin 78, and thus, also prevent the pivotal movement of the latch plate 48 from the latched position to the unlatched position. In otherwords, since the latch plate 48 is directly connected to the blocking arm 74 by the link 88, when the seat occupants attempts to pivot the release handle 60 and pivot the latch plate 48 from the latched position to the unlatched position, the link 88 pulls on the lower leg 76 to pivot the blocking arm 74 about the pivot pin 78. However, with the seat back 20 in the upright position, the lower leg 76 abuts with the nub 84 and prevents rotation of the blocking arm 74, and therefore, the latch plate 48 is also prevent from pivoting to the unlatched position.

To manipulate the seat assembly 14 from the seating position to the folded position, the seat occupant actuates a release lever 90 on the seat back pivot mechanism 22 to unlock the seat back 20 from the upright seating position. The seat back 20 may then be pivoted forwardly, or counterclockwise, about the seat back pivot mechanism 22, that defines the seat back pivot axis A, from the upright seating position to the forward folded position. As shown in FIG. 4, when the seat back 20 is in the folded position, resting against the seat cushion 18, the nub 84 is moved with the seat back 20 from a position adjacent to the lower leg 76 of the blocking arm 74, as shown in FIG. 3, to a position above and adjacent the upper arm 80, as shown in dashed lines in FIG. 4. Therefore, the blocking arm 74 is now clear to pivot about the pivot pin 78. Additionally, as long as the locking latch 46 is in the latched position, securing the latch plate 48 to the striker bar 56, the blocking arm 74 remains biased toward the counterclockwise direction and in the first blocking position as shown in dashed lines of FIG. 4. Therefore, the seat back 20 is free to pivot between the upright seating position and the folded position with the nub 84 rotating with the seat back 20 clear of the blocking arm 74.

To manipulate the seat assembly 14 from the folded position to the tumbled position, the seat occupant may now actuate the release handle 60 to pivot the locking latch 46 from the latched position engaged with the vehicle floor 16 to the unlatched position releases from the floor 16. More specifically, the release handle 60 is pivoted about the support brackets 44 in the clockwise, or downward, direction. The cam 61 on the release handle 60 engages with the cam lobe 63 on the latch plate 48 to rotate the latch plate 48 about the pivot rod 50 in the clockwise direction and disengage the hook portion 52 from the striker bar 56. Once the hook portion 52 is cleared from the striker bar 56, the latch gate 62 rotates about the pivot pin 64 until the gate finger 66 contacts the distal end of the hook portion 52 to retain the latch plate 48 in the unlatched position. Simultaneously, the extension portion 54 of the latch plate 48 pulls on the link 88, or cable, which is connected to the lower leg 76 of the blocking arm 74. The link 88 pivots the blocking arm 74 about the pivot pin 78 in the clockwise direction and against the biasing force of the spring 86 from the first blocking position to the second blocking position as shown in solid lines in FIG. 4. The latch gate 62 retains the latch plate 48 in the unlatched position, which therefore, retains the blocking arm 74 in the second blocking position. As depicted in FIG. 4, the upper arm 80 of the blocking arm 74 is now position immediately adjacent to and below the nub 84 on the seat back 20. Therefore, if the occupant attempts to pivot the seat back 20 from the folded position back to the upright seating position, the nub 84 will contact the upper arm 80 and prevent the pivotal movement of the seat back 20 while the locking latch 46 is in the unlatched position. The seat assembly 14 may now be pivoted about the front seat risers 34, 36 to the forward tumbled position as shown in FIG. 2. In the tumble position, the rear seat risers 40, 42 may be pivoted to a stowed position against the support frame 24 by a linkage mechanism as is commonly known in the art.

When it is desirable to return the seat assembly 14 from the folded and tumbled position to the seating position, the seat cushion 18 is pivoted rearwardly about the front seat risers 34, 36 with the seat back 20 in the folded position against the seat cushion 18. When the seat cushion 18 approaches the generally horizontal seating position as shown in FIG. 4, the latch gate 62 engages the striker bar 56 to pivot the latch gate 62 clockwise about the pivot pin 64 to the closed position and the striker bar 56 is received in the hook portion 52 of the latch plate 48. The latch spring 58 biases the latch plate 48 in the latched position engaged with and latched to the striker bar 56. Further, once the latch plate 48 is pivoted to the latched position, the tension on the link 88, or cable, is released. The spring 86 automatically pivots the blocking arm 74 about the pivot pin 78 from the second blocking position to the first blocking position. The blocking arm 74 is now spaced forward of and below the nub 84 on the seat back 20 so that the seat back 20 is free to pivot by the seat back pivot mechanism 22 from the folded position, as shown in FIG. 4, to the upright seating position and shown in FIG. 3. If the latch pate 48 is not pivoted to the latched position and engaged with the striker bar 56, the tension in the link 88 maintains the blocking arm 74 in the second blocking position to interfere with the nub 84 on the seat back 20 and prevent the seat back 20 from returning to the upright seat position.

The invention has been described in an illustrative manner, and it is to be understood that the terminology which has been used is intended to be in the nature of words of description rather than of limitation.

Obviously, many modification and variations of the present invention are possible in light of the above teachings. It is, therefore, to be understood that within the scope of the appended claims, the invention may be practiced other than as specifically described.

What is claimed is:

1. A seat assembly for use in an automotive vehicle comprising:
   a seat cushion for supporting a seat occupant on said seat assembly;
   a seat back operatively coupled to said seat cushion for pivotal movement between a generally upright seating position and a forwardly folded position pivoted against said seat cushion;
   a seat back pivot mechanism coupled to said seat back and operable between a locked position locking said seat back in said upright seating position and an unlocked position for providing pivotal movement of said seat back between said upright seating position and said folded position;
   a front seat riser adapted to secure said seat assembly to the vehicle, said front seat riser pivotally coupled to said seat cushion for pivoting said seat cushion between a generally horizontal seating position and a generally upright tumbled position;
   a rear seat riser adapted to releasably secure said seat assembly to the vehicle, said rear seat riser including a locking latch operable between a latched position for releasably latching said rear seat riser to the vehicle with said seat cushion in said seating position and an unlatched position for releasing said rear seat riser from the vehicle to allow said seat cushion to pivot from said seating position to said tumble position;
   a blocking member coupled between said seat back and said locking latch, said blocking member operable in a first blocking position for engaging said seat back in said upright seating position and preventing said locking latch from releasing from said latched position to said unlatched position when said seat back is locked by said seat back pivot mechanism in said upright seating position, and a second blocking position for engaging said seat back in said folded position when said locking latch is in said unlatched position and preventing pivotal movement of said seat back from said folded position to said seating position until said locking latch is returned to said latched position latching said rear seat riser to the vehicle with said seat cushion in said seating position, and
   said locking latch including a latch gate pivotally connected to said rear seat riser for pivotal movement between 1) an open position engaging and retaining said locking latch in said unlatched position when said seat cushion is released and pivotal between said seating position and said tumble position and for retaining said blocking member in said second blocking position until said locking latch is returned to said latched position and 2) a closed position disengaged from said locking latch when said locking latch is in said locked position.

2. A seat assembly as set forth in claim 1 further including a support bracket secured to said rear seat riser for supporting said seat back pivot mechanism between said seat back and said seat cushion and for supporting said blocking member between said locking latch and said seat back.

3. A seat assembly as set forth in claim 2 wherein said blocking member includes a blocking arm pivotally connected to said support plate for pivotal movement between said first blocking position and said second blocking position in response to said locking latch operating between said latched position and said unlatched position.

4. A seat assembly as set forth in claim 3 wherein said blocking member includes a spring bias member connected between said support bracket and said blocking arm for automatically returning said blocking arm to said first blocking position when said locking latch returns from said unlatched position to said latched position.

5. A seat assembly as set forth in claim 4 wherein said locking latch includes a latch plate pivotally coupled to said rear seat riser for pivotal movement between said latched position and said unlatched position.

6. A seat assembly as set forth in claim 5 further including a link interconnected between said latch plate and said blocking arm for pivoting said blocking arm from said first blocking position to said second blocking position in response to said latch plate pivoting from said latched position to said unlatched position.

7. A seat assembly as set forth in claim 6 wherein said locking latch includes a latch spring connected between said latch plate and said rear seat riser for biasing said latch plate from said unlatched position to said latched position.

8. A seat assembly as set forth in claim 7 wherein said locking latch includes a gate spring connected between said latch gate and said latch plate for biasing said latch gate to said open position.

9. A seat assembly as set forth in claim 8 further including a release handle pivotally secured to said rear seat riser and engagable with said locking latch for pivoting said latch plate from said latched position to said unlatched position.

10. A seat assembly as set forth in claim 9 wherein said blocking arm includes a lower leg pivotally connected to said support bracket for engaging said seat back in said first blocking position and an upper arm for engaging said seat back in said second blocking position.

11. A seat assembly as set forth in claim 10 further including a seat cushion spring bias member interconnected between said seat cushion and said front seat riser for biasing said seat cushion from said seating position to said tumbled position.

* * * * *